Allen C. Brader
INVENTOR.

Sept. 2, 1969  A. C. BRADER  3,464,114
DENTAL ATTACHMENT WITH COOPERATING EXTENSION OR SOCKET
Filed Sept. 21, 1967  2 Sheets-Sheet 2

Allen C. Brader
INVENTOR.

United States Patent Office 3,464,114
Patented Sept. 2, 1969

3,464,114
DENTAL ATTACHMENT WITH COOPERATING
EXTENSION OR SOCKET
Allen C. Brader, 1350 Hamilton St.,
Allentown, Pa. 18102
Filed Sept. 21, 1967, Ser. No. 669,598
Int. Cl. A61c 7/00
U.S. Cl. 32—14    15 Claims

ABSTRACT OF THE DISCLOSURE

A dental attachment employed in the practice of orthodontic methods which is fixed retentively in contact with a tooth to be moved and embodying an extension or socket capable of attachment with an arch form of wire or other resilient material with the arch form having an arch form attachment thereon for connection with the extension or socket.

The present invention generally relates to orthodontic methods and procedures and more particularly to a dental attachment having an extension or socket to which is connected an arch form to facilitate application of forces stored in the arch form to a tooth to be moved.

In the practice of orthodontic methods and procedures, it is well established that movement of teeth to improved positions requires the application of force for an extended period of time to each tooth to be moved. For applying such force to a tooth, there is normally provided a fixed tooth attachment generally called a dental attachment or a dental bracket which is fixed to a tooth in various manners. To provide the force necessary, most procedures for tooth movement apply forces stored in an arch form which may be an elastically deformed wire, rubber or other resilient material acting against and through the dental attachment and thus to the tooth. It is an object of the present invention to provide a dental attachment which incorporates therein an extension or socket capable of attachment with an energy storing and releasing component such as an arch form of wire or other resilient material.

Another object of the present invention is to provide a dental attachment fixed retentively to a tooth by means of a strip or band for surrounding a tooth, attached with cement or by interfitting relationship with a tooth surface so as to remain firmly in fixed position in relation to the tooth. A further object of the present invention is to provide a dental attachment constructed of materials with inherent resilience, constructed of materials permitting snap fit assembly with arch wires or other arch forms of attachments integral with the arch form, constructed of materials to match the natural teeth color, constructed with an integrally molded strip or band of metal or other supporting material to achieve concealed retention with a tooth.

Another object of the present invention is to provide a dental attachment constructed to engage an undercut on a tooth so as to be at least in part self-retaining with or without adhesives or cement, engage and cover only a portion of the exposed tooth surface or cover completely a tooth surface to provide protection for the tooth surface from the deleterious products of retained food decomposition and from bacteria.

Still another object of the present invention is to provide a dental attachment for mounting on a tooth constructed with a hollow cavity in its reverse or inner side to contain an adhesive or cement.

Yet another object of the present invention is to provide a dental attachment constructed in exact accordance with the shape of the tooth surface to which it is attached thus enhancing fit and assuring natural appearance as well as facilitating repositioning of malposed teeth to final optimum positions without intervening obstruction from portions of the dental attachment passing between adjacent teeth.

Yet another significant feature of the invention is to provide a dental attachment which is simple in construction, easy to apply, effective for its purposes and relatively inexpensive but yet dependable, long lasting and well adapted for its purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
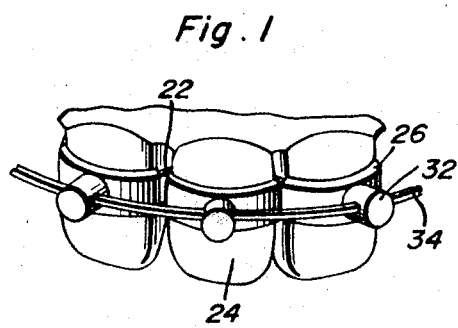
FIGURE 1 is a perspective view of an assembly illustrating one embodiment of dental attachment, the arch form connected thereto and the relationship thereof to a group of teeth.
Figure 2:
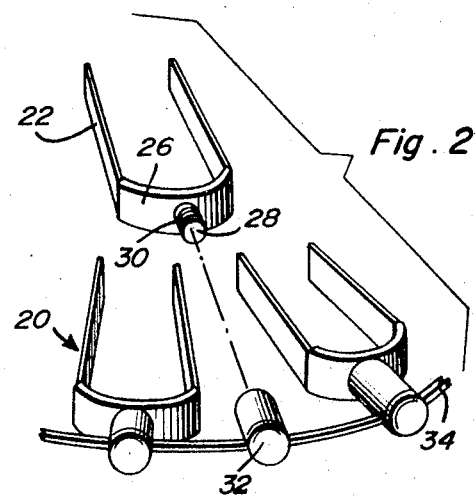
FIGURE 2 is an exploded group perspective view of the dental attachments illustrated in FIGURE 1.

Referring now specifically to the drawings, the dental attachment illustrated in FIGURES 1 and 2 is generally designated by the numeral 20 and includes a metal band in the form of a strip 22 attached to a tooth 24 in a conventional manner and being anchored thereto such as by securing the ends of the band in integral relation by welding, soldering, brazing, adhesives or any other suitable means. The attachment may also be attached through the use of a preformed ring type band of preselected size to permit close mechanical juxtaposition. Attached to and formed integrally with the portion of the strip band which extends across the front surface of the tooth 24 is a facing 26 constructed of plastic material which is molded onto the band strip 22. Integral with the facing 26 is an outwardly extending male extension 28 having a plurality of circumferential ridges and grooves 30 formed in the periphery thereof for facilitating connection with an arch form attachment 32 attached integrally to an arch form 34 such as an arch wire or the like. The arch form attachment 32 is in the form of a socket which telescopes and is secured to the male extension 28 by a snap fit, bonding or any other means for temporary or permanent connection between the arch form attachment 32 and the male extension 28.

Figure 3:
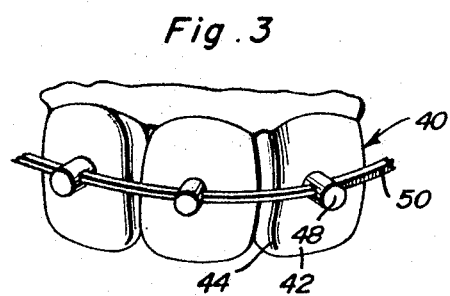
FIGURE 3 is a perspective view similar to FIGURE 1 but illustrating another embodiment of dental attachment.
Figure 4:
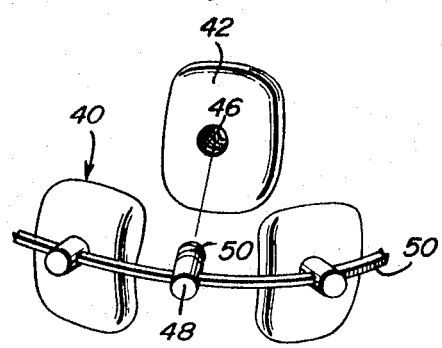
FIGURE 4 is an exploded group perspective view illustrating in more detail the specific construction of the dental attachment illustrated in FIGURE 3.

In FIGURE 3, the dental attachment is generally designated by numeral 40 and is in the form of a facing 42 which substantially completely covers the front surface of a tooth 44 with the front surface of the facing 42 having a female socket 46 formed therein for receiving a male type of arch form attachment 48 which is integrally connected with an arch form 50 in the form of an arch wire or the like. This type of structure is also provided with interengaging or associated ribs and grooves 50 in the periphery of the arch form attachment 48 and in the periphery of the female socket 46 in the facing 42.

Figure 5:
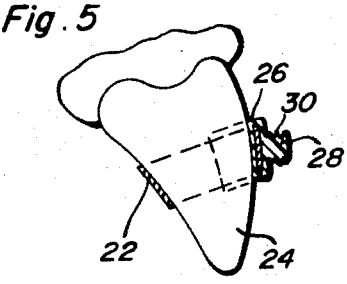
FIGURE 5 is a side elevational view of a tooth with a dental attachment associated therewith illustrating a male extension integral with the facing molded onto the tooth encircling band or strip.

FIGURE 5 illustrates the construction of FIGURES 1 and 2 with the band 22 being illustrated in section and the facing 26 and male extension 28 also being illustrated in section in order to illustrate the relationship of the dental attachment to the tooth 24.

Figure 6:
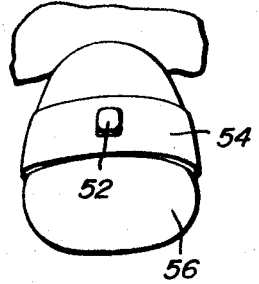
FIGURE 6 is an elevational view of an assembly similar to FIGURE 5 with the male extension being square in configuration.
Figure 7:
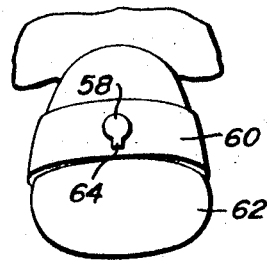
FIGURE 7 is an elevational view similar to FIGURE 6 but illustrating the male extension in the form of a circular member.

FIGURE 6 illustrates another embodiment of the invention in which a square extension 52 is employed on the band strip 54 which encircles the tooth 56. FIGURE 7 illustrates a cylindrical male extension 58 on the metal band strip 60 encircling the tooth 62. The male extension 58 is provided with a laterally extending lug or key 64 to key the arch form attachment thereto. In each embodiment illustrated in FIGURES 1, 2 and 5-7, the molded facing 26 with which the male extensions are integral partially covers the tooth surface. Also, each male extension may be provided with grooves or ridges or undercut for snap fitting engagement with the socket in the arch form attachment.

Figure 8:
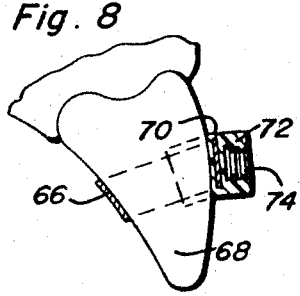
FIGURE 8 is a sectional view of a dental attachment illustrating a female socket formed in the facing on the metal band or strip.
Figure 9:
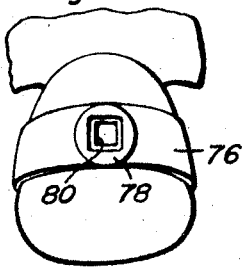
FIGURE 9 is an elevational view of a construction similar to FIGURE 8 illustrating a square socket.
Figure 10:
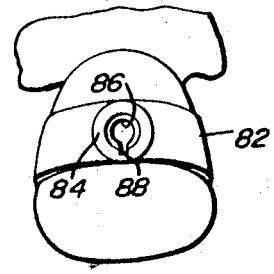
FIGURE 10 is an elevational view similar to FIGURE 9 illustrating a circular socket having a laterally extending recess communicating therewith.

FIGURE 8 illustrates a metal band strip 66 encircling a tooth 68 having a molded facing 70 thereon with the molded facing having an extension 72 thereon with a female socket 74 incorporated therein which may be provided with circumferential ribs or grooves or undercut for snap fit with an arch form attachment. FIGURE 9 illustrates the arrangement of FIGURE 8 in which the band strip 76 provided with the facing and extension 78 has a square socket 80 formed therein. FIGURE 10 illustrates the band strip 82 with the facing thereon provided with the extension 84 having a cylindrical recess 86 therein with a lateral recess or socket 88 forming a keyway for keying the dental attachment thereto. The female socket having an internal undercut and the male type of arch form attachment may be snap fitted together.

Figure 18:
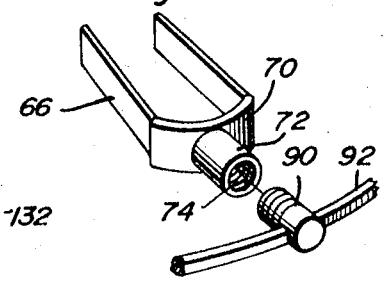
FIGURE 18 is an exploded group perspective view illustrating a structure similar to FIGURE 2 with the molded facing having a female socket extension.

FIGURE 18 illustrates in perspective, the metal band strip 66, facing 70, extension 72 and socket or recess 74 therein as well as the male arch form attachment 90 integral with the arch form 92 in the form of an arch wire or the like and illustrating the association or relationship of the dental attachment or bracket with the arch form attachment.

Figure 11:
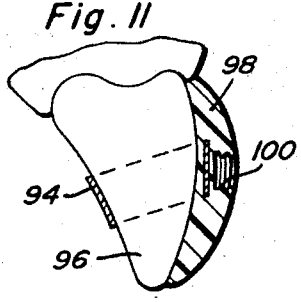
FIGURE 11 is a sectional view similar to FIGURE 8 but with the molded facing on the metal band completely covering the tooth surface with a female socket formed therein.
Figure 12:
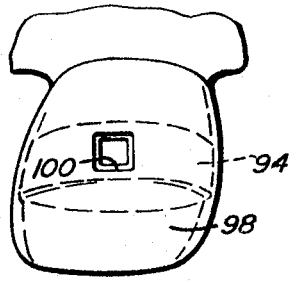
FIGURE 12 is an elevational view similar to FIGURE 11 with the female socket being illustrated as square.

FIGURES 11 and 12 illustrate a metal band strip 94 encircling a tooth 96 and having a facing 98 integral therewith and molded thereon in which the facing 98 completely covers the tooth surface. The facing 98 is provided with a female socket 100 having undercut grooves therein for receiving a male arch form attachment. The socket 100 may be round or square as illustrated in FIGURE 12 or any other desired socket shape. While a female socket 100 has been illustrated, for cooperatively receiving a male arch form attachment in a snap fit assembly, it is also possible to employ a male extension on the facing 98.

Figure 13:
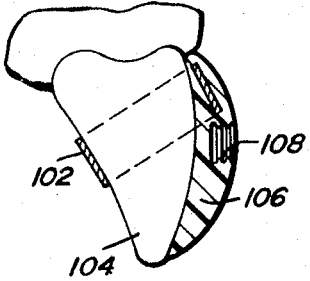
FIGURE 13 is a sectional view similar to FIGURE 11 illustrating the positioning of the band strip obliquely to the long axis of the tooth to remove the band insert from directly beneath the socket.

FIGURE 13 illustrates an embodiment similar to FIGURE 11 in which the metal band strip 102 encircles the tooth 104 and has the facing 106 molded thereon with the facing 106 having a socket 108 therein similar to the socket 100. In this construction, the band strip 102 is positioned obliquely to the long axis of the tooth to remove the band insert from directly beneath the socket 108. This gains space and achieves improved reciprocal retention from the band resting against tooth surfaces which are more nearly parallel to each other. By comparing the structures of FIGURES 11 and 13, it will be noted that the surfaces engaged by the band are more nearly parallel to each other in FIGURE 13 as in FIGURE 11.

Figure 14:
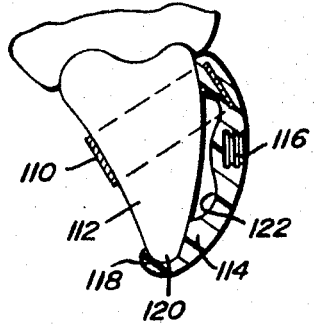
FIGURE 14 is a sectional view similar to FIGURES 11 and 13 but with the facing extending across the incisal edge and provided with a cavity hollowed into the rear surface thereof for reception of an adhesive or other bonding material.
Figure 15:
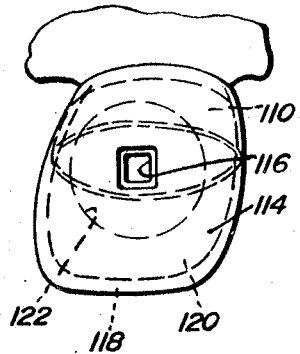
FIGURE 15 is an elevational view of the construction similar to FIGURE 14 but illustrating a square socket therein.

FIGURES 14 and 15 illustrate another embodiment of the invention in which the band 110 encircles the tooth 112 in the same manner as in FIGURE 13 with the facing 114 molded thereon and provided with a female socket 116 with a band 110 being oblique in the same manner as in FIG. 13.

In the embodiment of the invention illustrated in FIGURES 14 and 15, the facing 114 is provided with a relatively thin extension 118 which extends across the incisal edge 120 of the tooth 112. This construction serves as a positioning key in attaching the facing to the tooth during appliance assembly with the teeth to be treated. This makes the socket location consistent in relation to height on the surface of respective teeth and simplifies arch form manipulation during treatment. This construction also improves retention of the facing by providing extension into undercut areas on opposing tooth surfaces in that it provides an additional point of resistance to the natural direction of facing removal in conjunction with the band strip insert. The incisal extension 118 may be removed after the dental attachment has been completely attached or may remain if its presence does not interfere with occlusion of teeth of opposing dental arch. It will be appreciated that in this construction, the center height of the socket is determined by construction and is maintained during attachment of the facing either by the band strip, cementation or other means of attachment of the facing to the tooth.

Also, the facing 114 in FIGURES 14 and 15 is provided with a cavity 122 hollowed into the rear surface of the facing adjacent to the attaching tooth surface. This structure permits the insertion of pre-packaged adhesive components and vastly simplifies attachment of the facing to the tooth. A predetermined cement quantity obviates excess clean up after adhesion and puts the adhesive into position for immediate use thus saving time and effort. The possibility of adhesion by partial vacuum in conjunction with silicone rubber cements is accomplished by the provision of the cavity within the posterior surface of the facing. This would enable attachment in an expeditious manner without the use of the band strip if desired.

Figure 16:
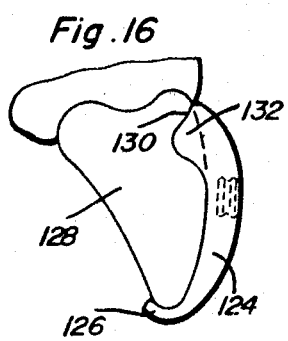
FIGURE 16 is a side elevational view illustrating a facing with lateral extensions disposed in an undercut female contour in the tooth.
Figure 17:
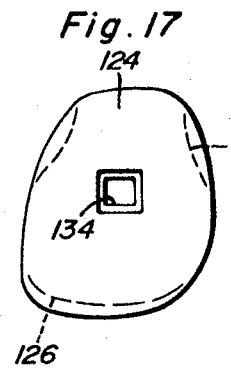
FIGURE 17 is an elevational view of the construction of FIGURE 16.

FIGURES 16 and 17 illustrate a dental attachment in the form of a facing 124 having an incisal extension 126 engaged with a tooth 128 having an undercut 130 in the front surface thereof which forms a female socket which receives a lateral extension 132 on the facing 124 which is provided with a socket 134 of any suitable shape or configuration. This construction provides for concealment of the arch form attachment and orthodontic appliance as a whole by being bonded to the tooth and further secured in place by the undercut socket in the tooth and lateral extensions on the facing which extend into the tooth undercuts.

The dental attachment disclosed embodies either a male extension or a female socket capable of attachment with an arch form attachment such as an arch wire or other resilient material which may be snap fitted or otherwise secured thereto. The dental attachment includes a facing which may partially or completely cover the presenting tooth surface and may match the natural teeth colors to enhance the appearance of the dental attachment and to achieve concealed retention with a tooth. The dental attachment may engage undercuts on a tooth so as to be in part self-retaining with or without adhesives or cement and the extensions or sockets may be keyed to locate consistently the point of energy application in relation to a tooth in which the key may mate cooperatively and retentively with the arch form or arch form attachment. The snap fit construction and the attachment socket are so constructed to be substantially concealed and self-contained which improves the appearance as well as patient acceptance and reduces irritation to lips, tongue or cheeks. The outer surface of the facing which completely covers the tooth surface may be contoured to a shape simulating closely the natural tooth surface thus enhancing the natural and normal appearance as contrasted with a metal strap and metal bracket across the tooth surface.

The employment of the cavity in the posterior surface of the facing permits insertion of adhesive by hypodermic needle injection through the bases of the socket. Thus, hardening agents or catalysts can be introduced to primary adhesive ingredients pre-positioned within the cavity by simple injection. The presence of the cavity also permits withdrawal of air, fluids, rubber sealants and the like by employing a hypodermic needle inserted through the socket with or without attachment to a vacuum pressure apparatus.

Thus, the dental attachment disclosed herein represents an optimum in natural tooth appearance, tooth protection, fit and effectively provides for tooth orientation, retention and lack of tissue irritation. It further provides, by increase of surface area on its back side, a greater resistance to the yielding of its adhesive attachment to the tooth under applied stress. The increase in volume over present thin metal parts provide space laterally of the socket for auxiliary attachments such as magnets, wires, rotation levers, eyelets, hooks and other items conjunctively employed in the orthodontic arts. These items can now be located in concealed and non-irritating position. The dental attachment further permits convenience of snap fit resilient retention with coperating arch form components of an orthodontic system of force application to dental structures.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A dental attachment for fixed retention with a tooth and adapted to be connected with an energy storing and releasing component, said dental attachment comprising a facing, means retentively mounting the facing on the presenting surface of a tooth, and undercut connection means integral with said facing for snap fitting assembly with the energy storing and releasing component.

2. The structure as defined in claim 1 wherein said connecting means is in the form of a male extension formed as an integral part of the facing.

3. The structure as defined in claim 1 wherein said connecting means is in the form of a female socket formed integrally in the molded plastic facing.

4. The structure as defined in claim 1 wherein said facing partially conceals the presenting tooth surface, said retention means including a band strip integrally formed with the facing for encircling the tooth for retentively fixing the attachment to the tooth.

5. The structure as defined in claim 1 wherein said facing completely covers the presenting surface of the tooth.

6. The structure as defined in claim 5 wherein said facing is provided with a cavity in the inner face thereof engaged with the presenting surface of the tooth, for receiving a bonding material to secure the facing to the tooth.

7. The structure as defined in claim 1 wherein said connecting means is non-symmetrical in cross-sectional configuration for keying engagement with an arch form attachment.

8. The dental attachment of claim 1 wherein said connecting means is oriented substantially in perpendicular relation to the long axis of the tooth and the presenting surface of the tooth for snap fit assembly by perpendicular engagement thereby permitting direct access to the tooth.

9. A dental attachment for fixed retention with a tooth and adapted to be connected with an energy storing and releasing component, said dental attachment comprising a facing, means retentively mounting the facing on the presenting surface of a tooth, and means embodied in said facing for connection with the energy storing and releasing component, having the connecting means integrally formed therewith, said facing completely covering the presenting surface of the tooth, said facing being integrally formed with a metal band strip encircling the tooth and forming the means retentively mounting the facing on the tooth.

10. The structure defined in claim 9 wherein said band strip is obliquely arranged relative to the long axis of the tooth.

11. The structure as defined in claim 9 wherein said facing includes an incisal extension extending across the incisal edge of a tooth.

12. A dental attachment for fixed retention with a tooth and adapted to be connected with an energy storing and releasing component, said dental attachment comprising a facing, means retentively mounting the facing on the presenting surface of a tooth, and means embodied in said facing for connection with the energy storing and releasing component, having the connecting means integrally formed therewith, said facing completely covering the presenting surface of the tooth, said facing including lateral extensions at the extremities thereof for extending into undercut portions of the tooth for anchoring the facing thereon.

13. The structure as defined in claim 12 wherein said retention means includes band means encircling the tooth thus forming a two piece assembly.

14. A dental appliance comprising a dental attachment including a facing, means retentively mounting the facing approximate the presenting surface of a tooth, an energy storing and releasing arch form, an arch form attachment on said arch form and coacting connecting means on said facing and arch form attachment for rigid assembly by engagement substantially perpendicular to the long axis of a tooth and the presenting surface thereof.

15. The structure as defined in claim 14 wherein said connecting means includes undercut coacting components of material enabling a telescopic snap fit assembly thereof.

References Cited

UNITED STATES PATENTS

| | | | |
|---|---|---|---|
| 1,240,731 | 9/1917 | Kinehan | 32—14 |
| 1,304,722 | 5/1919 | Young | 32—14 |
| 1,369,665 | 2/1921 | Johnson | 32—14 |
| 2,046,414 | 7/1936 | Russell | 32—14 |
| 2,930,126 | 3/1960 | Kesling | 32—14 |
| 3,128,552 | 4/1964 | Broussard | 32—14 |
| 3,203,098 | 8/1965 | Petraitis | 32—14 |
| 3,218,714 | 11/1965 | Wallshein | 32—14 |
| 3,303,565 | 2/1967 | Newman | 32—14 |

ROBERT PESHOCK, Primary Examiner